US010953331B2

(12) United States Patent
Lim (10) Patent No.: US 10,953,331 B2
(45) Date of Patent: Mar. 23, 2021

(54) BATTLEFIELD ONLINE GAME IMPLEMENTING AUGMENTED REALITY USING IOT DEVICE

(71) Applicants: NHN Entertainment Corporation, Seongnam-si (KR); NHN Studio629 Corporation, Seongnam-si (KR)

(72) Inventor: Chuljae Lim, Seongnam-si (KR)

(73) Assignees: NHN Entertainment Corporation, Seongnam-si (KR); NHN Studio629 Corporation, Seongnam-si (KR)

(*) Notice: Subject to any disclaimer, the term of this patent is extended or adjusted under 35 U.S.C. 154(b) by 0 days.

(21) Appl. No.: 15/395,604

(22) Filed: Dec. 30, 2016

(65) Prior Publication Data

US 2017/0232344 A1  Aug. 17, 2017

(30) Foreign Application Priority Data

Feb. 16, 2016 (KR) .................. 10-2016-0017894

(51) Int. Cl.
*A63F 13/5378* (2014.01)
*A63F 13/352* (2014.01)
*A63F 13/65* (2014.01)
*A63F 13/216* (2014.01)
*A63F 13/31* (2014.01)
(Continued)

(52) U.S. Cl.
CPC ........ *A63F 13/5378* (2014.09); *A63F 13/216* (2014.09); *A63F 13/31* (2014.09);
(Continued)

(58) Field of Classification Search
CPC .... A63F 13/5378; A63F 13/216; A63F 13/31; A63F 13/35; H04W 4/80; H04W 4/008;
(Continued)

(56) References Cited

U.S. PATENT DOCUMENTS 7,751,829 B2   7/2010   Masuoka et al.
8,290,511 B2  10/2012   Burdo et al.
(Continued)

FOREIGN PATENT DOCUMENTS

JP   2001-34378    2/2001
JP   2005099018    4/2005
(Continued)

OTHER PUBLICATIONS

Notification of Reasons for Refusal dated Jan. 30, 2018, issued in Japanese Patent Application No. 2017-004981.
(Continued)

*Primary Examiner* — Werner G Garner
(74) *Attorney, Agent, or Firm* — H.C. Park & Associates, PLC (57) ABSTRACT

A method of providing a game based on augmented reality includes: performing, at an augmented map server, three-dimensional (3D) modeling based on object information about a reality object in response to extracting a location of the reality object from a map provided from a map server; mapping, at the augmented map server, an augmented reality object based on a location of the reality object in response to creating an augmented map according to performing of the 3D modeling; determining a location of a client based on beacon information of at least one Internet of Things (IoT) device configured as a beacon; and providing an augmented reality game environment by disposing the reality object on the augmented map based on the location of the client.

10 Claims, 6 Drawing Sheets (51) Int. Cl.
*A63F 13/35* (2014.01)
*H04W 4/80* (2018.01)
*G06T 17/05* (2011.01)
*G06T 19/00* (2011.01)
*H04L 29/06* (2006.01)
*H04W 4/02* (2018.01)
*H04W 40/24* (2009.01)

(52) U.S. Cl.
CPC ............ *A63F 13/35* (2014.09); *A63F 13/352* (2014.09); *A63F 13/65* (2014.09); *G06T 17/05* (2013.01); *G06T 19/006* (2013.01); *H04L 67/38* (2013.01); *H04W 4/023* (2013.01); *H04W 4/80* (2018.02); *H04W 40/244* (2013.01)

(58) Field of Classification Search
CPC ...... H04W 4/023; H04W 4/244; G06T 17/05; G06T 19/006; H04L 67/38
See application file for complete search history.

(56) References Cited

U.S. PATENT DOCUMENTS

| | | | |
|---|---|---|---|
| 9,143,897 B2 | 9/2015 | Kuramura et al. | |
| 2014/0302915 A1* | 10/2014 | Lyons | G07F 17/3237 |
| | | | 463/25 |
| 2015/0379777 A1 | 12/2015 | Sasaki | |
| 2016/0148433 A1* | 5/2016 | Petrovskaya | G06T 19/006 |
| | | | 345/633 |
| 2017/0168767 A1* | 6/2017 | Guo | G06F 3/1423 |
| 2017/0221272 A1* | 8/2017 | Li | G06T 7/204 |
| 2018/0279408 A1* | 9/2018 | Jha | H04W 52/0216 |
| 2018/0317260 A1* | 11/2018 | Lee | H04W 74/0833 |
| 2018/0322776 A1* | 11/2018 | Bararsani | G08G 1/0112 |

FOREIGN PATENT DOCUMENTS

| | | |
|---|---|---|
| JP | 2014150536 | 8/2014 |
| JP | 2014174589 | 9/2014 |
| JP | 2016-502133 | 1/2016 |
| KR | 10-2012-0139888 | 12/2012 |
| KR | 101305059 B1 * | 9/2013 |

OTHER PUBLICATIONS

"Ingress: A real territory taking game created by Google.", Aug. 2, 2014, Available at:<<http://www.appbank.net/2014/08/02/iphoneapplication/868470.php>>.

Office Action dated Oct. 2, 2018, issued in the Japanese patent Application No. 2017-004981.

* cited by examiner

BATTLEFIELD ONLINE GAME IMPLEMENTING AUGMENTED REALITY USING IOT DEVICE

CROSS-REFERENCE TO RELATED APPLICATION

This application claims priority from and the benefit of Korean Patent Application No. 10-2016-0017894, filed on Feb. 16, 2016, which is hereby incorporated by reference for all purposes as if fully set forth herein.

BACKGROUND OF THE INVENTION

Field of the Invention

Exemplary embodiments relate to a method and system for providing a battlefield online game by embodying augmented reality.

Description of Related Art

Augmented reality refers to a term derived from a virtual environment and virtual reality, and indicates a mixture of a real world image and a virtual image by inserting a computer graphics image into the real environment. The real world image may include information not required by a user and may not include information required by the user. However, the virtual image created at a computer may simplify, delete, and/or process information not required by the user. That is, the augmented reality enables an interaction with the user in real time by combining the real world image and the virtual image.

The augmented reality is applied to a first-person shooter (FPS), an adventure, an action game, a real survival game, and the like. Games to which the augmented reality is applied are generally based on reality. Thus, the user may be further realistically immersed into the games.

Korean Patent Publication No. 10-2012-0139888 relates to a method and system for providing a game using augmented reality, and discloses technology for providing a game by locating a user terminal to be mapped to a real world only when an image related to various types of sensors is displayed, and by locating the user terminal at a location most convenient for a game user. However, in the related art, only communication between a game server and a user terminal is configured and thus, a delay may occur, which may lead to decrease the user's immersion into a game.

SUMMARY OF THE INVENTION

Exemplary embodiments provide a method that enables a game server to provide an augmented reality game environment by mapping an augmented reality object based on a location of a reality object in response to receiving an augmented map, by determining a location of a client from an Internet of things (IoT) device, and by disposing a reality object on an augmented map based on the location of the client.

Additional features of the invention will be set forth in the description which follows, and in part will be apparent from the description, or may be learned by practice of the invention.

Exemplary embodiments disclose a module a method of providing a game based on augmented reality, the method including performing, at an augmented map server, three-dimensional (3D) modeling based on object information about a reality object in response to extracting a location of the reality object from a map provided from a map server; mapping, at the augmented map server, an augmented reality object based on a location of the reality object in response to creating an augmented map according to performing of the 3D modeling; determining a location of a client based on beacon information of at least one Internet of Things (IoT) device configured as a beacon; and providing an augmented reality game environment by disposing the reality object on the augmented map based on the location of the client.

The game providing method may further include disposing the augmented reality object based on the location of the reality object extracted from the map through a specific device in response to not performing the 3D modeling on the augmented map.

The determining of the location of the client may include determining a location of a user by performing wireless near field communication between the beacon and a device worn by the user, and the device worn by the user may include a head mounted display (HMD) device or an AR-type device that provides an augmented reality function.

The determining of the location of the client may include calculating 3D location coordinates of the client based on a triangulation technique or a trilateration technique using at least three beacons, in response to performing wireless near field communication between the beacon and the client.

The providing of the augmented reality game environment may include providing a battlefield environment and proceeding with a game through a predetermined game rule by locating at least three beacons, and by mapping the augmented reality object and the reality object based on beacon information of the at least three beacons and the location of the client.

The providing of the augmented reality game environment may include determining whether a distance between the reality object and the augmented reality object measured at a distance sensor or the beacon is included in a predetermined distance range, and providing the augmented reality game environment in response to determining that the distance between the reality object and the augmented reality object is included in the predetermined distance.

Exemplary embodiments also disclose a computer program included in a non-transitory computer-readable recording medium to implement a method of providing a game based on augmented reality configured as a computer, wherein the method of providing the game includes performing, at an augmented map server, 3D modeling based on object information about a reality object in response to extracting a location of the reality object from a map provided from a map server; mapping, at the augmented map server, an augmented reality object to correspond to a location of the reality object in response to creating an augmented map according to performing of the 3D modeling; determining a location of a client based on beacon information of at least one Internet of Things (IoT) device configured as a beacon; and providing an augmented reality game environment by disposing the reality object on the augmented map based on the location of the client.

Exemplary embodiments also disclose a game providing server based on augmented reality, including a receiver configured to receive an augmented map that is created in response to performing 3D modeling based on object information about a reality object at an augmented map server; a mapper configured to map an augmented reality object based on a location of the reliability object in response to receiving the augmented map; a determiner configured to determine a location of a client based on beacon information of at least one Internet of Things (IoT) device configured as a beacon; and a provider configured to provide an augmented reality game environment by disposing the reality object on the augmented map based on the location of the client.

The game providing server may further include disposing the augmented reality object based on the location of the reality object of the augmented map through a specific device in response to not performing the 3D modeling on the augmented map.

The receiver may be further configured to provide map data and object information about the reality object to the augmented map server in response to extracting a location of the reality object from a map provided from a map server.

The determiner may be further configured to determine a location of a user by performing wireless near field communication between the beacon and a device worn by the user, and the device worn by the user may include an HMD device or an AR-type device that provides an augmented reality function.

The determiner may be further configured to calculate 3D location coordinates of the client based on a triangulation technique or a trilateration technique using at least three beacons in response to performing wireless near field communication between the beacon and the client.

The provider may be further configured to provide a battlefield environment and proceed with a game through a predetermined game rule by locating at least three beacons, and by mapping the augmented reality object and the reality object based on beacon information of the at least three beacons and the location of the client.

The provider may be further configured to determine whether a distance between the reality object and the augmented reality object measured at a distance sensor or the beacon is included in a predetermined distance range, and to provide the augmented reality game environment in response to determining that the distance between the reality object and the augmented reality object is included in the predetermined distance.

According to exemplary embodiments, since a game server may provide a battlefield online game based on augmented reality by performing 3D modeling based on a map of a real world instead of creating a new map, it is possible to decrease server load.

Also, according to exemplary embodiments, a game server may quickly proceed with a game without buffering by performing wireless near field communication with a client using an IoT device and may provide a game environment based on a reaction of a client. Thus, it is possible to enhance a user's immersion into the game.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the inventive concept and are incorporated in and constitute a part of this specification, illustrate exemplary embodiments of the invention, and together with the description serve to explain the principles of the inventive concept.

DETAILED DESCRIPTION OF THE ILLUSTRATED EMBODIMENTS

Exemplary embodiments will be described in detail with reference to the accompanying drawings. These exemplary embodiments will be described in detail for those skilled in the art in order to practice the present disclosure. It should be appreciated that various exemplary embodiments are different but do not have to be exclusive. For example, specific shapes, configurations, and characteristics described in an exemplary embodiment may be implemented in another exemplary embodiment without departing from the spirit and the scope of the present disclosure. In addition, it should be understood that position and arrangement of individual components in each disclosed exemplary embodiment may be changed without departing from the spirit and the scope of the present disclosure. Therefore, a detailed description described below should not be construed as being restrictive. In addition, the scope of the present disclosure is defined only by the accompanying claims and their equivalents if appropriate. Similar reference numerals will be used to describe the same or similar functions throughout the accompanying drawings. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

The terminology used herein is for the purpose of describing exemplary embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, elements and/or components, but do not preclude the presence or addition of one or more other features, integers, steps, operations, elements, components, and/or groups thereof.

It will be understood that when an element is referred to as being "connected to" another element, it can be directly connected to the other element, or intervening elements may be present.

Hereinafter, exemplary embodiments will be described with reference to the accompanying drawings.

Figure 1:
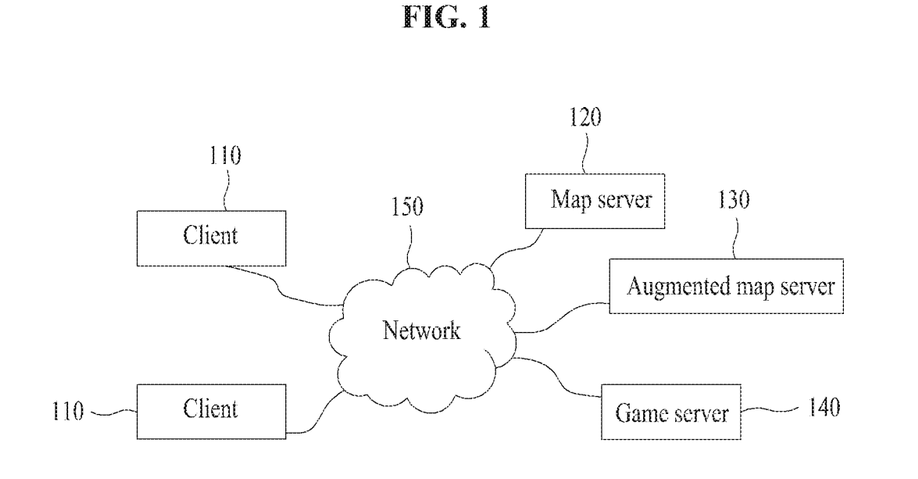
FIG. 1 illustrates an example of a network environment according to exemplary embodiments.

FIG. 1 illustrates an example of a network environment according to exemplary embodiments.

Referring to FIG. 1, the network environment includes clients 110, servers, for example, a map server 120, an augmented map server 130, and a game server 140, and a network 150. FIG. 1 is provided as an example only and thus, the number of terminals and/or the number of servers are not limited thereto.

The client 110 refers to an electronic device that performs wireless communication with an IoT device acting as a beacon, and may be a fixed terminal or a mobile terminal configured as a computer device. For example, the client 110 may be a wearable device, a head mounted display (HMD)

device, an AR-type device providing an augmented reality function, a smartphone, a mobile phone, a navigation, a computer, a laptop computer, a digital broadcasting terminal, a personal digital assistance (PDA), a portable multimedia player (PMP), a tablet PC, and the like. The client 110 may communicate with another client 110 and/or the game server 140 over the network 150 in a wired communication manner or a wireless communication manner.

The communication scheme is not particularly limited and may include a communication method that uses a wireless near field communication between devices as well as a communication method using a communication network, for example, a mobile communication network, the wired Internet, the wireless Internet, and a broadcasting network, etc., which may be included in the network 150. For example, the network 150 may include at least one of network topologies that include networks, for example, a personal area network (PAN), a local area network (LAN), a campus area network (CAN), a metropolitan area network (MAN), a wide area network (WAN), a broadband network (BBN), the Internet, and the like. Also, the network 150 may include at least one of network topologies that include a bus network, a star network, a ring network, a mesh network, a star-bus network, a tree or hierarchical network, and the like. However, it is only an example and the exemplary embodiments are not limited thereto.

Each of the servers, for example, the map server 120, the augmented map server 130, and the game server 140, may be configured as a computer device or a plurality of computer devices that provides instructions, codes, files, contents, services, etc., through communication with the client 110 and the network 150.

For example, the game server 140 may provide a file for installing an application to the client 110 connected through the network 150. In this case, the client 110 may install the application using the file provided from the game server 140. Also, the client 110 may use a service or content provided from the game server 140 by connecting to the game server 140 under control of at least one program, for example, a browser or the installed application, and an operating system (OS) included in the client 110. For example, in response to a service request message transmitted from the client 110 to the game server 140 over the network under control of the application, the game server 140 may transmit a code corresponding to the service request message to the client 110. The client 110 may provide content for the user by configuring and displaying a screen corresponding to the code under control of the application.

Figure 2:
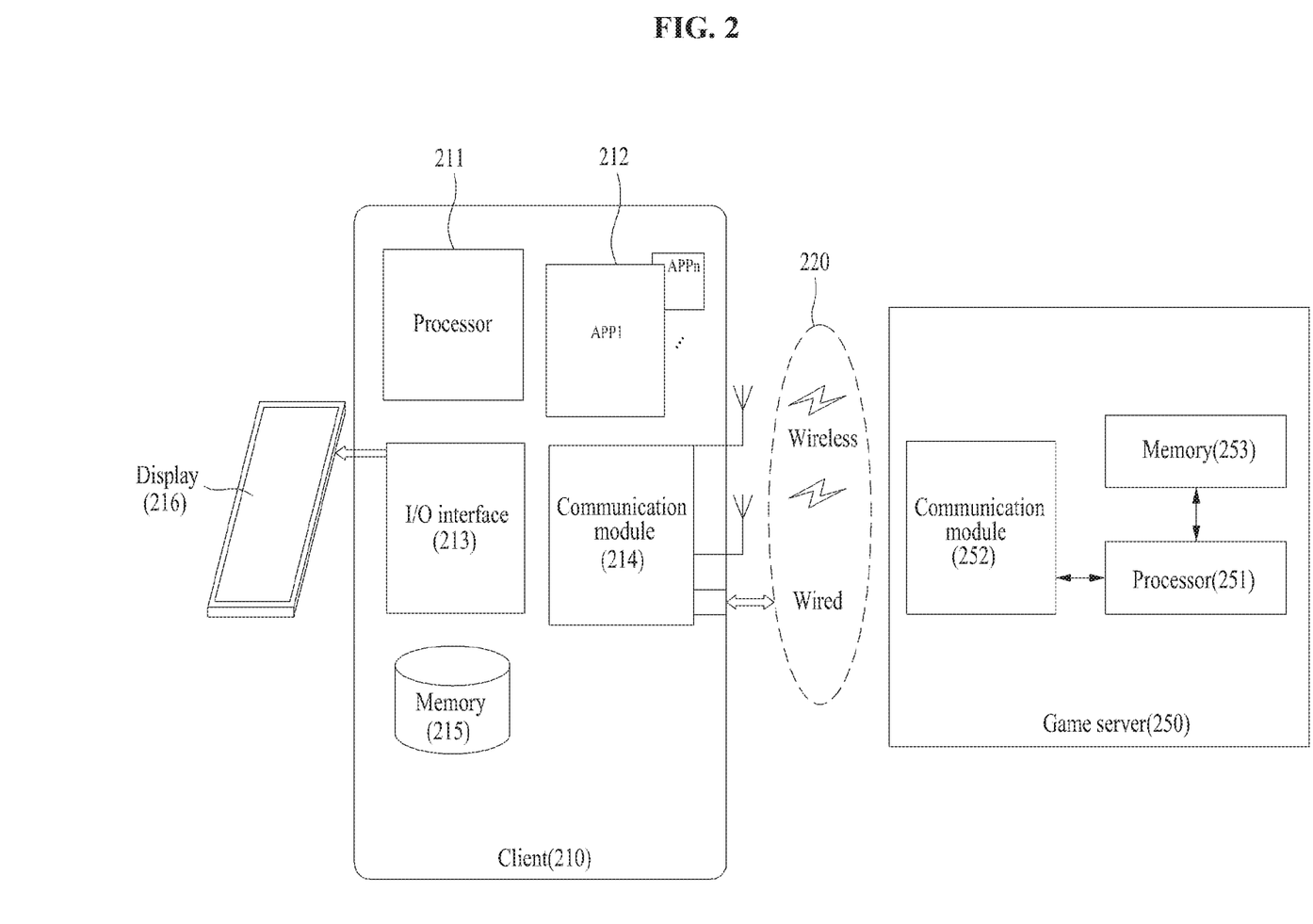
FIG. 2 illustrates an example of a configuration of a client and a game server according to exemplary embodiments.

FIG. 2 illustrates an example of a client and a game server according to exemplary embodiments.

Referring to FIG. 2, a client 210 may include, for example, a processor 211, an input/output (I/O) interface 213, a communication module 214, a memory 215, and a display 216. The client 210 may include the processor 211 and one or more applications 212 that operate on the client 210.

The client 210 may include the memory 215, the processor 211, the communication module 214, and the I/O interface 213. A game server 250 may include a memory 253, a processor 251, and a communication module 252. The memory 215, 253 may include a permanent mass storage device, such as random access memory (RAM), read only memory (ROM), a disk drive, etc., as a computer-readable storage medium. Also, an operating system (OS) and at least one program code, for example, the aforementioned code for a browser or the application installed and executed on the client 210, may be stored in the memory 215, 253. Such software constituent elements may be loaded from another computer-readable storage medium separate from the memory 215, 253 using a drive mechanism. The other computer-readable storage medium may include, for example, a floppy drive, a disk, a tape, a DVD/CD-ROM drive, a memory card, etc. According to other exemplary embodiments, software constituent elements may be loaded to the memory 215, 253 through the communication module 214, 252, instead of, or in addition to, the computer-readable storage medium. For example, at least one program may be loaded to the memory 215, 253 based on a program, for example, the application, installed by files provided over the network 220 from developers or a file distribution system, for example, the game server 140, which provides an installation file of the application.

The processor 211, 251 may be configured to process computer-readable instructions, for example, the aforementioned at least one program code, of a computer program by performing basic arithmetic operations, logic operations, and I/O operations. The computer-readable instructions may be provided from the memory 215, 253 and/or the communication module 214, 252 to the processor 211, 251. For example, the processor 211, 251 may be configured to execute received instructions in response to the program code stored in the storage device, such as the memory 215, 253.

The communication module 214, 252 may provide a function for communication between the client 210 and the game server 250 over the network 220, and may provide a function for communication with another client or another server. For example, a request created at the processor 211 of the client 210 based on a program code stored in a storage device such as the memory 215 may be transferred to the game server 250 over the network 220 under control of the communication module 214. Inversely, a control signal, an instruction, content, a file, etc., provided under control of the processor 251 of the game server 250 may be received at the client 210 through the communication module 214 of the client 210 by going through the communication module 252 and the network 220. For example, a control signal, an instruction, etc., of the game server 250 received through the communication module 214 may be transferred to the processor 211 or the memory 215, and content, a file, etc., may be stored in a storage medium further includable in the client 210.

The I/O interface 213 may be a device used for interface with an I/O device. For example, an input device may include a keyboard, a mouse, etc., and an output device may include a device, such as a display for displaying a communication session of an application. As another example, the I/O interface 213 may be a device for interface with an apparatus in which an input function and an output function are integrated into a single function, such as a touch screen. In detail, when processing instructions of the computer program loaded to the memory 215, the processor 211 of the client 210 may display a service screen configured using data provided from the game server 250 or another terminal, or may display content on the display 216 through the I/O interface 213.

According to other exemplary embodiments, the client 210 and the game server 250 may include a greater or lesser number of constituent elements than the number of constituent elements of FIG. 2. However, there is no need to clearly illustrate many constituent elements according to the related art. For example, the client 210 may include at least a portion of an I/O device, or may further include other constituent elements, for example, a transceiver, a global positioning system (GPS) module, a camera, a variety of sensors, a database, and the like.

Figure 3:
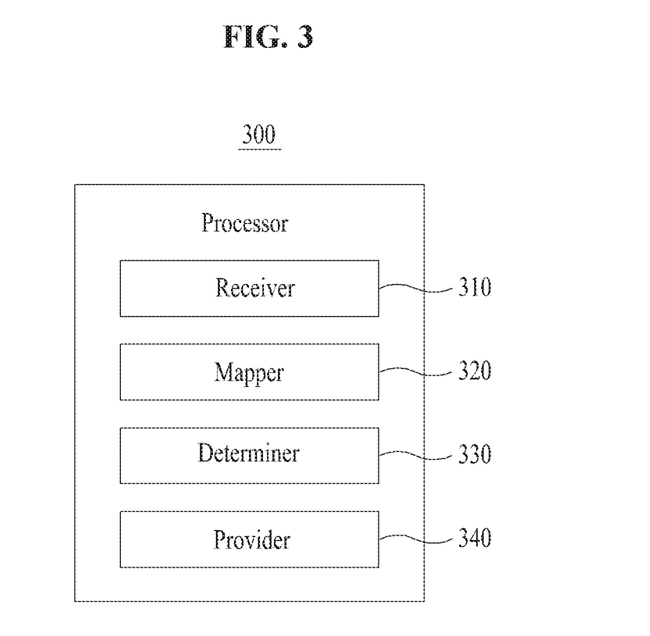
FIG. 3 illustrates an example of a processor included in a game server according to exemplary embodiments.

FIG. 3 illustrates an example of a processor included in a game server according to exemplary embodiments.

Referring to FIG. 3, a processor 300 included in the game server may include a receiver 310, a mapper 320, a determiner 330, and a provider 340 as constituent elements. The processor 300 and the constituent elements of the processor 300 may be configured to execute instructions according to at least one program code and a code of an OS included in a memory. Here, the constituent elements of the processor 300 may be representations of different functions performed at the processor 300 in response to a control command provided from a program code stored in the game server.

The processor 300 may load, to the memory, a program code stored in a file of a program for a game providing method based on augmented reality. Each of the processor 300 and the receiver 310, the mapper 320, the determiner 330, and the provider 340 included in the processor 300 may execute an instruction corresponding to the program code loaded to the memory.

The receiver 310 may receive an augmented map that is created in response to performing 3D modeling based on object information about a reality object at an augmented map server. The receiver 310 may provide map data and object information about the reality object to the augmented map server in response to extracting a location of the reality object from a map provided from a map server.

The mapper 320 may map an augmented reality object based on a location of the reality object in response to receiving the augmented map.

The determiner 330 may determine a location of a client based on beacon information of a beacon. The determiner 330 may determine a location of a user by performing a wireless near field communication between the beacon and a device worn by the user. The determiner 330 may calculate 3D location coordinates of the client based on a triangulation technique or a trilateration technique using at least three beacons in response to performing wireless near field communication between the beacon and the client.

The provider 340 may provide an augmented reality game environment by disposing the reality object on the augmented map based on the location of the client. The provider 340 may provide a battlefield environment and proceed with a game through a predetermined game rule by locating at least three beacons, and by mapping the augmented reality object and the reality object based on beacon information of the at least three beacons and the location of the client. The provider 340 may determine whether a distance between the reality object and the augmented reality object measured at a distance sensor or the beacon is included in a predetermined distance range, and may provide the augmented reality game environment in response to determining that the distance between the reality object and the augmented reality object is included in the predetermined distance.

Figure 4:
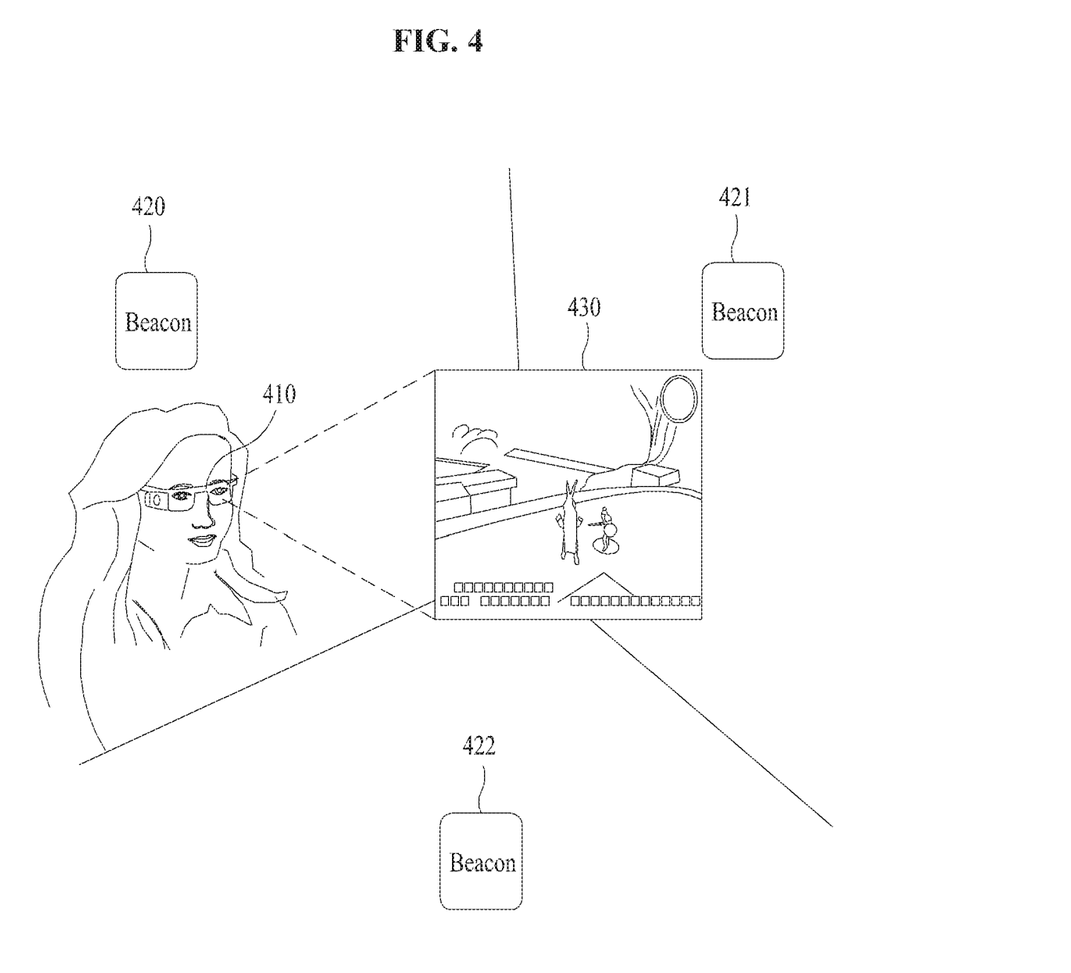
FIG. 4 illustrates an example of an operation of a game server that embodies augmented reality according to exemplary embodiments.

FIG. 4 illustrates an example of an operation of a game server that embodies augmented reality according to exemplary embodiments.

A map server is configured to provide a map, and may store the map in a map database. Here, the map server may provide the map stored in the map database as a map service. The map server may provide the map itself to a user, and also may process the map and provide the processed map. For example, Internet portable sites, for example, Google, Naver, Daum, etc., may provide the respective map services, for example, Google map, Naver map, Daum map, etc, and may provide an open source, such as API of Google.

An augmented map server may receive the map from the map server, and may perform 3D modeling based on reality object information about a reality object. Here, the augmented map server may create an augmented map by performing 3D modeling based on a location value and location information associated with the reality object. For example, the augmented map server may receive a map API of Google provided from the map server, and may add game information for providing an augmented reality game environment. The augmented map server may create the augmented map by adding a map, items, characters, etc., associated with a game to the map.

In response to the augmented map server creating the augmented map by performing 3D modeling, the game server may map an augmented reality object based on a location of the reality object. The game server may provide an augmented reality game environment 430 by disposing the reality object on the augmented reality object. For example, assuming a battle game, the game server may map an augmented reality object in which a battle environment created at the augmented map server is constructed at a location of a reality object.

Here, if 3D modeling on the augmented map fails, the game server may dispose the augmented reality object based on the location of the reality object of the map using specific equipment. For example, the game server may provide the augmented reality game environment 430 by verifying a location of the reality object through an apparatus for tracking a pattern and a location, and by disposing the augmented reality object.

The game server may determine a location of a client using one or more IoT devices that acts as beacons 420, 421, and 422. Also, the game server may determine the location of the client based on location information received from a GPS and beacon information of beacons 420, 421, and 422. Here, the beacon information may include unique identification data of the respective beacons 420, 421, and 422, location information thereof, etc.

The game server may verify the location of the client through wireless communication with the beacons 420, 421, and 422. For example, the user may wear a wearable device 410, for example, an HMD device or an AR-type device, which provides an augmented reality function, and may perform Bluetooth communication with the beacons 420, 421, and 422. The user may execute and operate a game in which the augmented reality output through the apparatuses is configured.

The AR-type device may include wearable glasses, a device that combines a virtual reality and a camera and provides location information of a GPS, etc. The HMD device is an image display device configured to display an image of augmented reality and an image of virtual reality through a variety of sensor techniques and wireless communication. The HMD device or the AR-type device may move a scene displayed on a screen in response to a movement of the user on a 3D space, and may enhance the user's immersion into and the reality of game content by applying a motion of the user to content control.

If a distance between the reality object and the augmented reality object is not secured at a distance sensor and the like configured to measure a distance, the game server may not provide an augmented reality game environment. The game server may determine whether a distance between the reality object and the augmented reality object measured at the beacon or a distance sensor is included in a predetermined distance range, and may provide the augmented reality game environment in response to determining that the distance between the reality object and the augmented reality object is included in the predetermined distance. Here, the game server may use all of the augmented reality object and the reality object as the game object.

The game server may provide a battlefield environment and may proceed with a game through a predetermined game rule by locating at least three beacons, and by mapping the augmented reality object and the reality object based on beacon information of the at least three beacons and the location of the client.

As described above, the game server may provide a game in which a battle takes place using a weapon or a tool at a view of the user to a first person shooter (FPS), for example, an adventure game, an action game, a reality survival game, etc. The game server may provide a game that is created using a 3D scheme and thus, provides a view of a character in the game to be the same as a view of the user, and provides an enhanced reality compared to other games. Here, the game server may provide a view shift of the character to interact with a client, and accordingly, the user may shift a view of the character at the user's intention so that the character may perform an action using the weapon or body.

According to exemplary embodiments, the game server may create an augmented map by performing 3D modeling based on a map of real world, without performing a separate operation on a map or creating a new map, and may configure a battlefield environment by mapping an augmented reality object. Thus, it is possible to provide a battlefield online game based on the augmented reality.

According to exemplary embodiments, the game server may quickly proceed with a game without buffering by performing wireless near field communication with the client using an IoT device acting as a beacon, and may provide a game environment corresponding to a reaction of the client in real time. Thus, it is possible to enhance the user's immersion into the game.

Figure 5:
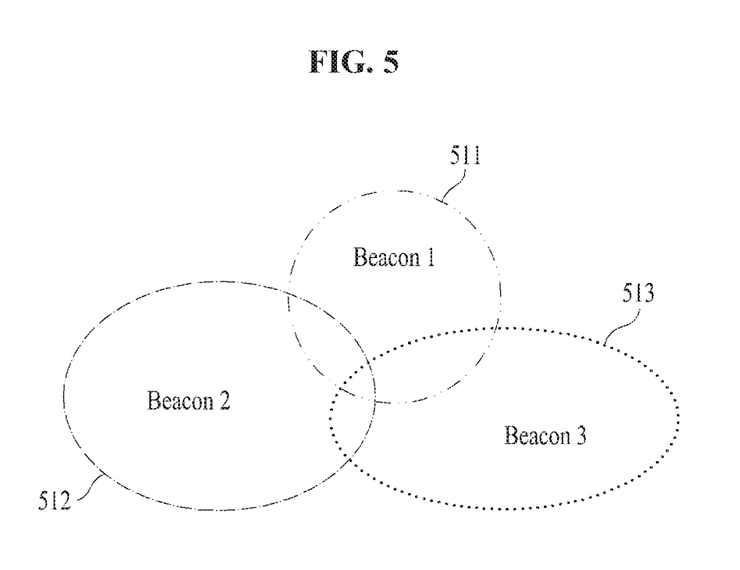
FIG. 5 illustrates an example of searching, at a game server, for a location of a client according to exemplary embodiments.

FIG. 5 illustrates an example of searching, at a game server, for a location of a client according to exemplary embodiments.

The game server may search for the location of the client using an IoT device acting as a beacon, may provide a game environment by mapping an augmented reality object and a reality object, and may proceed with a game based on a predetermined game rule. For example, the game server may determine the location of the client based on the beacon and information, such as location information of a GPS, a distance sensor, and the like.

For example, with assumption that a first beacon (beacon 1) 511, a second beacon (beacon 2) 512, and a third beacon (beacon 3) 513 are present, each beacon may include unique identification data. Each of the first beacon 511, the second beacon 512, and the third beacon 513 may be fixed to a place, such as a wall, as a fixed node, and may be used to recognize a mobile node. Each of the first beacon 511, the second beacon 512, and the third beacon 513 may track the location of the client.

The game server may calculate 3D location coordinates of the client based on a triangulation technique or a trilateration technique using at least three beacons. Here, the triangulation technique refers to a method of calculating coordinates and a distance of a single point using a feature of a triangle, and may induce location coordinates by, if a point and two reference points are given, measuring angles between a base and other two sides from a triangle configured by the point and the two reference points, by measuring a length of the side, and by performing some calculations. The trilateration technique refers to a method of calculating a relative location of an object using the geometry of a triangle and may use at least two reference points and a distance between an object and each reference point.

The game server may calculate location coordinates using equations of three circles, each in which a distance between each beacon and the location of the client is defined as a radius, based on at least three beacons.

Alternatively, the game server may perform a 3D location recognition calculation by calculating a location of the user using four beacons and a trilateration technique, and may calculate location coordinates by inducing a maximum value and a minimum value of the calculated coordinates of the user, by defining a 3D area in which the coordinates are distributed, by decomposing the 3D area at specific distance intervals, and by applying an average value of four intersection points of the circular circumference configured by a beacons Also, the game server may calculate the location of the client based on a beacon signal strength.

Figure 6:
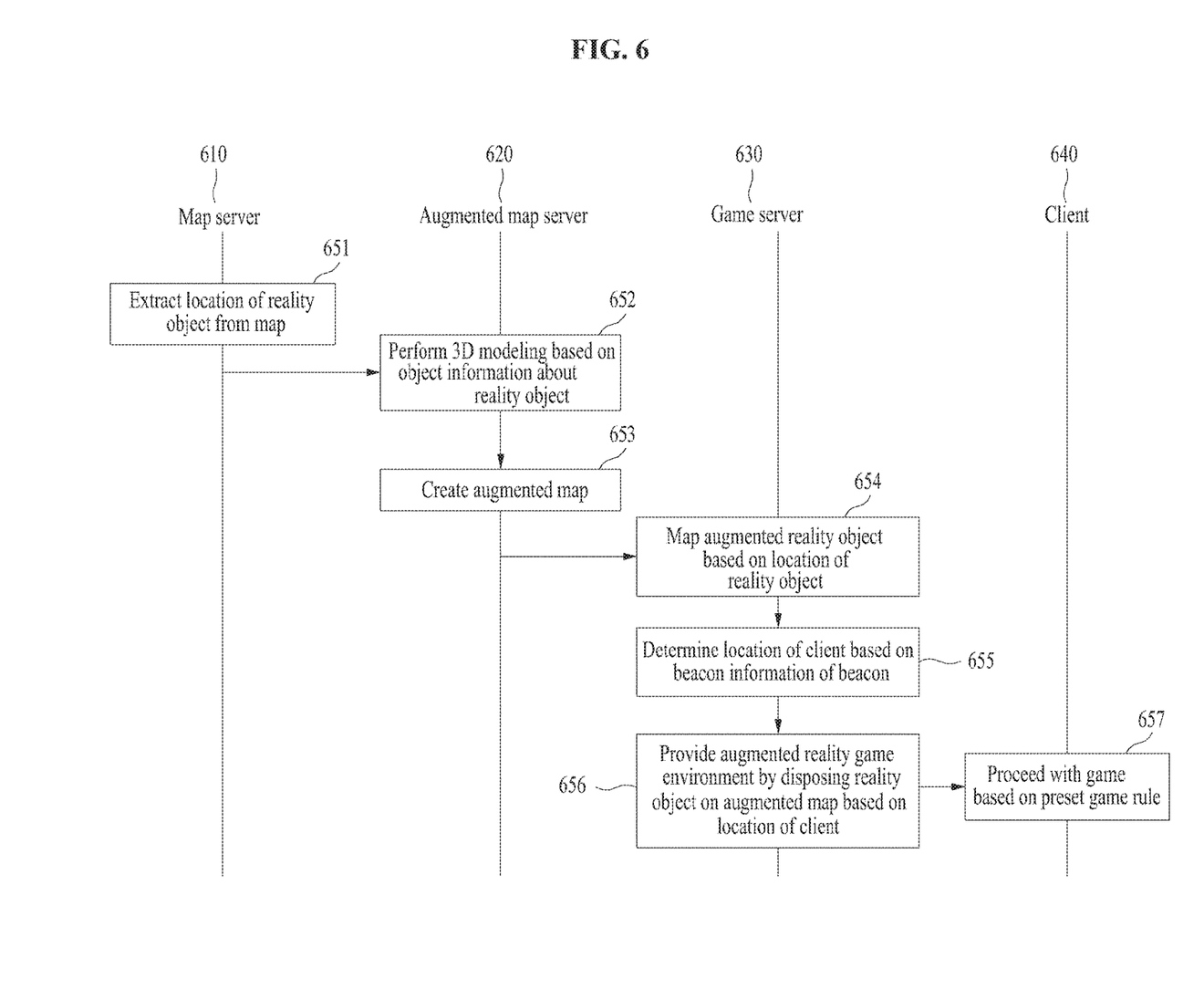
FIG. 6 illustrates an example of a method of executing a battlefield online game using augmented reality according to exemplary embodiments.

FIG. 6 illustrates an example of a method of executing a battlefield online game using augmented reality according to exemplary embodiments.

In operation 651, a map server 610 may store map data and may extract a location of a reality object based on location information of a map. The map server 610 may transfer the map data and object information about the reality object to an augmented map server 620.

The augmented map server 620 may perform 3D modeling based on the object information about the reality object received from the map server 610 in operation 652, and may create an augmented map in operation 653. For example, the augmented map server 620 may transfer the augmented map created by performing 3D modeling to a game server 630.

In operation 654, the game server 630 may receive the augmented map from the augmented map server 620 and may map an augmented reality object based on a location of the reality object. In operation 655, the game server 630 may determine a location of a client 640 based on location information of a GPS and beacon information of a beacon. The game server 630 may calculate 3D location coordinates of the client 640 based on a triangulation technique or a trilateration technique using at least three beacons, in response to performing wireless near field communication between the beacon and the like.

In operation 656, the game server 630 may provide an augmented reality game environment by disposing the reality object on an augmented map based on the location of the client 640. Here, the game server 630 may determine the location of the client 640 using an IoT device. In response to interaction between the game server 630 and the client 640 through wireless communication, the game server 630 may provide the augmented reality game environment by disposing the reality object on the augmented map based on the location of the client 640. In operation 657, the game server 630 may proceed with a game based on a preset game rule.

The units described herein may be implemented using hardware components, software components, and/or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The exemplary embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes of the present disclosure, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method of providing a game based on augmented reality, the method comprising:
   receiving a map from a remote map server;
   performing, at an augmented map server, three-dimensional (3D) modeling based on object information about a reality object in response to extracting a location of the reality object from the map provided from the map server;
   mapping, at the augmented map server, an augmented reality object based on the location of the reality object in response to creating an augmented map upon successful 3D modeling, and disposing the augmented reality object based on the location of the reality object extracted from the map through verifying the location of the reality object through an apparatus for tracking a pattern and a location upon failed 3D modeling;
   determining a location of a client based on beacon information of at least one Internet of Things (IoT) device configured as a beacon; and
   providing an augmented reality game environment by disposing the reality object on the augmented map based on the location of the client,
   wherein the providing of the augmented reality game environment comprises determining whether a distance between the reality object and the augmented reality object measured at a distance sensor or the beacon is within a predetermined distance range, and providing the augmented reality game environment in response to determining that the distance between the reality object and the augmented reality object is within the predetermined distance.

2. The method of claim 1, wherein the determining of the location of the client comprises:
   determining a location of a user by performing wireless near field communication between the beacon and a device worn by the user, and
   the device worn by the user comprises a head mounted display (HMD) device or an AR-type device that provides an augmented reality function.

3. The method of claim 2, wherein the determining of the location of the client comprises calculating 3D location coordinates of the client based on a triangulation technique or a trilateration technique using at least three beacons, in response to performing wireless near field communication between the beacon and the client.

4. The method of claim 1, wherein the providing of the augmented reality game environment comprises providing a battlefield environment and proceeding with a game through a predetermined game rule by locating at least three beacons, and by mapping the augmented reality object and the reality object based on beacon information of the at least three beacons and the location of the client.

5. A non-transitory computer-readable storage medium having stored thereon processor-executable instructions configured to cause a processor to perform operations to implement a method of providing a game based on augmented reality configured as a computer, wherein the method of providing the game comprises:
   receiving a map from a remote map server;
   performing, at an augmented map server, three-dimensional (3D) modeling based on object information about a reality object in response to extracting a location of the reality object from the map provided from the map server;
   mapping, at the augmented map server, an augmented reality object based on the location of the reality object in response to creating an augmented map upon successful 3D modeling, and disposing the augmented reality object based on the location of the reality object extracted from the map through verifying the location of the reality object through an apparatus for tracking a pattern and a location upon failed 3D modeling;
   determining a location of a client based on beacon information of at least one Internet of Things (IoT) device configured as a beacon; and
   providing an augmented reality game environment by disposing the reality object on the augmented map based on the location of the client,
   wherein the providing of the augmented reality game environment comprises determining whether a distance between the reality object and the augmented reality object measured at a distance sensor or the beacon is within a predetermined distance range, and providing the augmented reality game environment in response to determining that the distance between the reality object and the augmented reality object is within the predetermined distance.

6. A game providing server based on augmented reality, comprising:
  a receiver configured to receive an augmented map that is created in response to performing three-dimensional (3D) modeling based on object information about a reality object at an augmented map server;
  a mapper configured to map an augmented reality object based on a location of the reality object in response to receiving the augmented map upon successful 3D modeling, and disposing the augmented reality object based on the location of the reality object extracted from the map through verifying the location of the reality object through an apparatus for tracking a pattern and a location upon failed 3D modeling;
  a determiner configured to determine a location of a client based on beacon information of at least one Internet of Things (IoT) device configured as a beacon; and
  a provider configured to provide an augmented reality game environment by disposing the reality object on the augmented map based on the location of the client,
  wherein the provider is further configured to determine whether a distance between the reality object and the augmented reality object measured at a distance sensor or the beacon is within a predetermined distance range, and to provide the augmented reality game environment in response to determining that the distance between the reality object and the augmented reality object is within the predetermined distance.

7. The game providing server of claim 6, wherein the receiver is further configured to provide map data and object information about the reality object to the augmented map server in response to extracting a location of the reality object from a map provided from a map server.

8. The game providing server of claim 6, wherein the determiner is further configured to determine a location of a user by performing wireless near field communication between the beacon and a device worn by the user, and
  the device worn by the user comprises a head mounted display (HMD) device or an AR-type device that provides an augmented reality function.

9. The game providing server of claim 8, wherein the determiner is further configured to calculate 3D location coordinates of the client based on a triangulation technique or a trilateration technique using at least three beacons in response to performing wireless near field communication between the beacon and the client.

10. The game providing server of claim 6, wherein the provider is further configured to provide a battlefield environment and proceed with a game through a predetermined game rule by locating at least three beacons, and by mapping the augmented reality object and the reality object based on beacon information of the at least three beacons and the location of the client.

* * * * *